Figure 1:
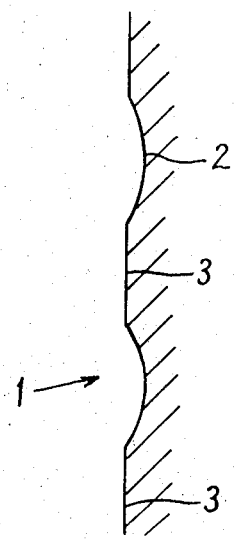

United States Patent [19]
Hill et al.

[11] 3,721,163
[45] March 20, 1973

[54] PISTONS
[75] Inventors: Harold Taylor Hill; Ronald Morris Caton, both of Sway, Lymington, England
[73] Assignee: Wellworthy Limited, Lymington, England
[22] Filed: Sept. 23, 1970
[21] Appl. No.: 74,593

[52] U.S. Cl..................................92/158, 29/156.5
[51] Int. Cl. ...............................................F16j 1/08
[58] Field of Search...............92/159, 158, 160, 153; 29/156.5

[56] References Cited

UNITED STATES PATENTS

| | | | |
|---|---|---|---|
| 2,077,880 | 4/1937 | Gits | 308/98 X |
| 1,336,342 | 4/1920 | Blankfield | 92/160 |
| 1,379,257 | 5/1921 | Gorham | 92/160 |
| 1,492,397 | 4/1924 | Roberts | 92/158 X |
| 1,951,959 | 3/1934 | Alexandrescu | 92/160 |
| 2,197,942 | 4/1940 | Over | 92/160 |
| 3,106,138 | 10/1963 | Thoma | 92/160 X |

FOREIGN PATENTS OR APPLICATIONS

| | | | |
|---|---|---|---|
| 505,264 | 5/1920 | France | 92/159 |
| 1,116,371 | 1/1956 | France | 92/158 |
| 349,248 | 5/1931 | Great Britain | 92/158 |

Primary Examiner—Martin P. Schwadron
Assistant Examiner—Irwin C. Cohen
Attorney—Holcombe, Wetherill & Brisebois

[57] ABSTRACT

This invention relates to pistons comprising a crown and side wall. In order to enhance lubrication of the skirt, the side wall is formed with a circumferentially extending helical groove; at least a part of this groove has a predetermined profile. For example, that part of the groove next adjacent the crown has a predetermined profile and the profile of at least a portion of the remainder of the groove is of random nature. The groove may either be symmetrical or asymmetrical. The invention also relates to a method for making a piston which includes the step of cutting in the side wall thereof a circumferentially extending helical groove, at least part of which is of predetermined profile.

7 Claims, 5 Drawing Figures

PATENTED MAR 20 1973  3,721,163

PISTONS

The present invention relates to pistons, and to reciprocating piston machines, such as internal combustion engines or compressors, incorporating them.

According to the present invention, a piston comprises a crown, and a side wall formed with a circumferentially extending helical groove, at least part of which groove has a predetermined profile.

The upper part of the groove, i.e., the part of the groove next adjacent to the crown, may be of predetermined profile, i.e., it may extend inwardly from its juncture with the surface of the side wall at a predetermined profile whilst the profile of a portion or all of the remainder of the groove may be random or uncontrolled. Alternatively, a major proportion, e.g., substantially the entire profile of the groove, may be predetermined; for example, the groove may have a symmetrical profile, for example, it may be, in cross-section, radiused, part-circular or V-form, or alternatively it may have an assymetric profile, for example, it may be wedge-shaped. The groove, which may extend around the piston skirt which forms the part of the side wall between the piston ring groove-carrying portion and the open end of the side wall, may be circumferentially continuous or interrupted, and may extend over a part of, or substantially the entire axial extent of the skirt.

The invention also consists in a method of making a piston which includes the step of cutting in the side wall of the piston a circumferentially extending helical groove having a predetermined profile.

The groove may be formed by cam turning using a diamond or equivalent cutting tool having the predetermined profile, the feed of the tool determining the pitch of the helix of the groove.

In order that the invention may be more readily understood, reference will now be made to the accompanying drawing, in which:

FIGS. 1 to 4 are fragmentary longitudinal sections of piston skirt embodying profiled grooves according to different embodiments of the invention, and FIG. 5 is a side elevation, on a considerably reduced scale, of a piston.

In the embodiment illustrated in FIG. 1, the skirt 1 of a light alloy piston is formed with a radiused groove 2. This groove 2 is in the form of a continuous helix or thread cut into the outer surface of the skirt, and has a depth and width of approximately 0.001 inch and 0.015 inch respectively. The pitch of the helical groove 2 is such that a land 3 approximately 0.015 inch wide is formed between adjacent turns of the helix.

Figure 2:
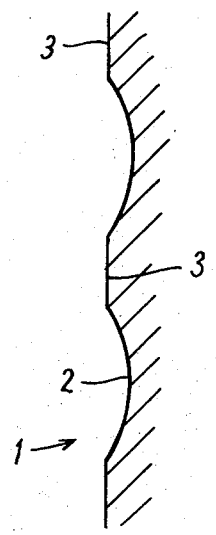

In FIG. 2, the groove width and depth are approximately 0.020 inch and 0.0013 inch respectively, whilst the land width is approximately 0.010 inch.

Figure 3:
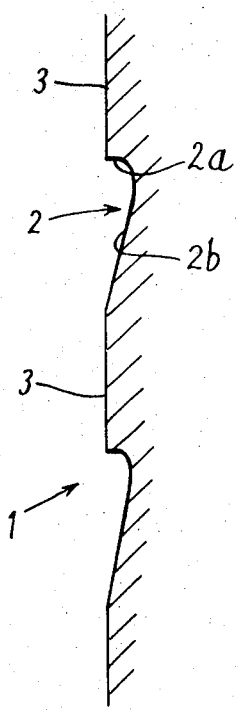
Figure 4:
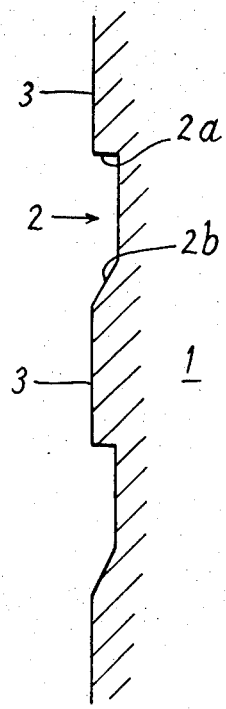

In the embodiments shown in FIGS. 1 and 2, the grooves 2 have symmetrical profiles, whereas, in FIGS. 3 and 4 the grooves are of assymetric profile. In FIGS. 3 and 4, the profile of each groove 2 is such that its upper part 2a next adjacent the piston crown (not shown) is disposed substantially normally with respect to the external surface of the skirt 1, so that a sharp corner is formed at the juncture of the part 2a and skirt 1. The lower part 2b of each groove 2 is inclined relative to, and blends into, the surface of the skirt 1.

Although, in FIGS. 1 to 4, only two adjacent turns of each groove 2 have been shown, on a considerably magnified scale, the skirt will, in practice, be provided with a plurality of turns, which, due to their microscopic cross-sectional dimensions, pitch and spacing, form a surface finish on the skirt covering the entire, or a part of the axial height of the skirt, between the piston ring-groove carrier 4 (FIG. 5) and the open end 5 of the piston side wall. Due to the said microscopic dimensions and extremely fine pitch of the groove 2, the groove, or each individual turn thereof, is substantially invisible, or not clearly distinguishable, to the human eye, and has, therefore, not been shown in FIG. 5.

When a piston incorporating a grooved skirt as described and illustrated is operatively assembled within a cylinder (not shown) of an internal combustion engine, lubrication of the skirt is enhanced due to the fact that lubricant will tend to accumulate within the groove 2 during reciprocation of the piston. This enhanced lubrication tends to reduce the formation of hard spots on the bearing surfaces of the skirt which slidably cooperate with the cylinder bore, i.e., the lands 3, and also tends to heal or disperse any hard spots which may form. The grooving of the skirt also tends to localize any such hard spots, and to assist in initial bedding-in of the piston.

In the embodiments illustrated in FIGS. 1 and 2 it will be seen that the included angle between the skirt surface and the upper part of the groove, i.e., the part 2a most adjacent the piston crown, is greater than 90°. However, in each of the FIGS. 3 and 4 embodiments, the included angle between the skirt surface and upper part 2a of the groove 2 is approximately 90° (although it may alternatively be less than 90°) so that a sharp corner is formed at the juncture of the skirt surface and part 2a. Thus, as the piston passes down the cylinder bore during operation, the sharp edge will tend to scrape oil off the surface of the cylinder bore into the groove 2. During the upward or compression stroke of the piston, the inclined part 2b of the groove will create a wedging action, so that oil within the groove will tend to flow out of the groove between the skirt surface and cylinder bore.

It will be appreciated that the side wall of a piston such as that shown in FIG. 5, which includes the piston ring carrier 4 adjacent to and integral with the crown 6, and the skirt 1 which depends from and is integral with the carrier 4, is not generally of simple cylindrical form, but has a complex contour or shape. The external surface of the side wall may, for example, taper longitudinally, it may be oval in cross-section with the degree of ovality varying along the piston axis, and/or it may be bevelled. This complex shape is achieved by cam turning the side wall, in which technique a cutting tool, such as diamond or carbide tipped tool, is advanced relative to the direction of the piston axis and is simultaneously displaced toward or away from the piston to produce the required shape, in accordance with a predetermined program determined by one or more control cams. In this event, the groove 2 will be cut into the skirt simultaneously with the cam turning operation, by employing an additional cutting tool, shown diagrammatically in broken lines at 7 in FIG. 1, having a cutting edge shaped to correspond to the profile of the groove 2, mounted for movement in unison with the first-mentioned tool, but trailing the latter tool, for example by approximately one-eighth inch, and by adjusting the rate of feed or advance of the tool to produce the required groove spacing or pitch.

It will be understood that various modifications may be made without departing from the scope of the present invention. For example, instead of forming a circumferentially continuous helical groove around the periphery of the skirt, the groove may be interrupted so that only certain zones of the skirt will be grooved. These zones may comprise the thrust faces of the skirt, i.e., the diametrically opposed zones of the skirt circumferentially displaced from the gudgeon pin boss axis by approximately 90°. The axial extent of the grooved zone or zones of the skirt may be varied, as may be the pitch, profile and depth of the groove.

Groove profiles other than those specifically illustrated, may be employed. For example, the included angle between the skirt surface and upper part 2a of a groove shown in FIGS. 3 and 4 may be reduced to a value less than 90° so that the part 2a will be inclined upwardly away from the skirt surface to take a hooked form, thus enhancing the scraping effect of the groove.

Instead of forming the entire cross-section of the continuous or interrupted groove to a predetermined profile as shown in the drawings, only the profile, and in particular, the angle, of the upper part 29 of the groove, need be controlled or predetermined. For example, the included angle between the skirt surface and upper part 2a should be greater than 90° if the groove is to effect oil retention alone, or 90° or less if the groove is additionally to effect a scraping action. The remainder or lower part of the groove may have a random or effectively uncontrolled profile.

Instead of shaping and finishing the skirt by means of one tool, and simultaneously forming the groove in the finished surface by means of a second separate tool moving in unison with the first tool, the two tools may be formed integrally.

We claim:

1. A piston comprising a crown and a side wall formed with a lubricant-retentive surface finish comprising a plurality of adjacent turns of a single, circumferentially-extending helical groove, said adjacent turns defining therebetween a circumferentially extending helical land, the width of said land is in the order of 0.010 inch to 0.015 inch, the width of said groove is in the order of 0.015 inch and 0.020 inch and the depth of said groove is in the order of 0.001 inch and 0.0013 inch, at least a part of said groove having a predetermined profile.

2. A piston according to claim 1, wherein that part of said groove next adjacent to said crown is of predetermined profile whilst the profile of at least a portion of the remainder of said groove is of random nature.

3. A piston according to claim 1, wherein said groove has a symmetrical profile.

4. A piston according to claim 3, in which said groove has a part-circular cross-section.

5. A piston according to claim 1, wherein said groove has a wedge-shaped profile.

6. A method of making a piston having a crown and a side wall, which method includes the step of cutting in said side wall of said piston a plurality of adjacent turns of a single, circumferentially-extending helical groove said adjacent turns defining therebetween a circumferentially extending land, the groove width is of the order of 0.015 inch to 0.020 inch, the depth of the said helical groove is of the order of 0.001 inch to 0.0013 inch and the width of the said helical land is of the order of 0.015 inch to 0.010 inch, at least part of which groove is of precisely predetermined profile, whereby the turns of said helical groove form a lubricant-retentive surface finish on said side wall.

7. A method according to claim 6, wherein said groove is formed by cam turning, using a cutting tool having said predetermined profile and said tool being fed at a rate to determine the pitch of the helix of said groove.

* * * * *

UNITED STATES PATENT OFFICE
CERTIFICATE OF CORRECTION

Patent No. 3,721,163          Dated March 20, 1973

Inventor(s) Harold Taylor Hill & Ronald Morris Caton

It is certified that error appears in the above-identified patent and that said Letters Patent are hereby corrected as shown below:

[30]   Foreign Application Priority Data

September 24, 1969   Great Britain . . . 47080/69

On the front page, directly below the Abstract, change this line to read:
   --7 Claims, 4 Drawing Figures--

Column 1, line 42, cancel ", and" and substitute --.--
   cancel lines 43 and 44.

Column 2, line 6, cancel "4 (FIG. 5)" and substitute
         --(not shown)--;
   same line, cancel "5";
   line 11, cancel "and has, therefore, not been shown in FIG. 5." and substitute --.--;
   line 45, cancel "such as that shown in FIG.5";
   line 46, cancel "4";
   same line, cancel "6";
   line 48, cancel "4";
   line 63, cancel "shown";
   line 64, cancel "diagrammatically in broken lines at 7 in FIG. 1,".

Signed and sealed this 5th day of March 1974.

(SEAL)
Attest:

EDWARD M. FLETCHER, JR.          C. MARSHALL DANN
Attesting Officer                Commissioner of Patents